(12) United States Patent
Gonsalves

(10) Patent No.: US 7,684,096 B2
(45) Date of Patent: Mar. 23, 2010

(54) AUTOMATIC COLOR CORRECTION FOR SEQUENCES OF IMAGES

(75) Inventor: Robert Gonsalves, Wellesley, MA (US)

(73) Assignee: Avid Technology, Inc., Tewksbury, MA (US)

( * ) Notice: Subject to any disclaimer, the term of this patent is extended or adjusted under 35 U.S.C. 154(b) by 1327 days.

(21) Appl. No.: 10/404,708

(22) Filed: Apr. 1, 2003

(65) Prior Publication Data

US 2004/0197022 A1 Oct. 7, 2004

(51) Int. Cl.
G03F 3/08 (2006.01)
G06F 15/00 (2006.01)
H04N 1/46 (2006.01)
G06K 9/00 (2006.01)

(52) U.S. Cl. .................. 358/518; 358/1.9; 358/537; 382/167

(58) Field of Classification Search .................. 358/1.9, 358/518, 520, 522, 516, 529, 540, 537, 479; 382/167, 162, 171, 168, 170, 172
See application file for complete search history.

(56) References Cited

U.S. PATENT DOCUMENTS

| | | | |
|---|---|---|---|
| 2,571,697 A | | 10/1951 | Evans |
| 4,667,228 A | | 5/1987 | Kawamura et al. |
| 4,694,329 A | * | 9/1987 | Belmares-Sarabia et al. ..... 348/586 |
| 4,908,701 A | | 3/1990 | Udagawa |
| 5,060,060 A | | 10/1991 | Udagawa et al. |
| 5,353,061 A | * | 10/1994 | Rodriguez et al. ..... 375/240.12 |
| 5,371,615 A | | 12/1994 | Eschbach |

(Continued)

FOREIGN PATENT DOCUMENTS

EP 1160727 5/2001

(Continued)

OTHER PUBLICATIONS

Cardei, Vlad C., et al., "White Point Estimation for Uncalibrated Images", In Proceedings of the Seventh Color Imaging Conference (CIC'99). Imaging Science and Technology Society, Nov. 1999.

*Primary Examiner*—Madeleine A Nguyen
(74) *Attorney, Agent, or Firm*—Peter J. Gordon; Oliver Strimpel

(57) ABSTRACT

Automatic color correction is applied to a scene or clip, including a sequence of images, in a motion picture by selecting a representative image of the scene, analyzing the image and adjusting parameters of a color correction operation that is performed on the sequence of images included in the scene. This operation can be repeated automatically for all scenes or for selected scenes in the motion picture. The parameters may be adjusted to automatically color balance the image while maintaining substantially constant contrast. Analysis of the representative image may include identifying an offset of a peak in a two-dimensional histogram of the colors in the representative image from a white point. Parameters of a color correction operation are adjusted according to this offset. Separate histograms and offsets may be determined for shadows, midtones and highlight regions of the representative image. Analysis of the representative image may include determining a one-dimensional histogram of the luminance information in the representative image. The darkest level and the brightest level in the image are used to balance the image. In particular, the histograms for color channels in the image, such as red, green and blue, are adjusted to match the darkest level and brightest level identified by the luminance histogram.

34 Claims, 9 Drawing Sheets

U.S. PATENT DOCUMENTS

| | | | | |
|---|---|---|---|---|
| 5,387,930 A * | 2/1995 | Toh | | 348/222.1 |
| 5,420,704 A * | 5/1995 | Winkelman | | 358/520 |
| 5,541,649 A | 7/1996 | Yamamoto et al. | | |
| 5,608,548 A | 3/1997 | Sobol | | |
| 5,668,890 A * | 9/1997 | Winkelman | | 382/167 |
| 5,781,188 A * | 7/1998 | Amiot et al. | | 715/723 |
| 5,808,697 A * | 9/1998 | Fujimura et al. | | 348/672 |
| 5,812,286 A | 9/1998 | Lin | | |
| 5,926,291 A | 7/1999 | Haraguchi et al. | | |
| 5,949,918 A * | 9/1999 | McCaffrey | | 382/274 |
| 5,982,926 A * | 11/1999 | Kuo et al. | | 382/167 |
| 6,108,037 A | 8/2000 | Takei et al. | | |
| 6,151,064 A * | 11/2000 | Connolly et al. | | 348/93 |
| 6,151,410 A * | 11/2000 | Kuwata et al. | | 382/167 |
| 6,181,321 B1 | 1/2001 | Zhao et al. | | |
| 6,198,841 B1 * | 3/2001 | Toyama et al. | | 382/164 |
| 6,278,482 B1 * | 8/2001 | Ashizaki | | 348/86 |
| 6,381,363 B1 * | 4/2002 | Murching et al. | | 382/164 |
| 6,459,825 B1 * | 10/2002 | Lippincott | | 382/312 |
| 6,571,255 B1 * | 5/2003 | Gonsalves et al. | | 707/104.1 |
| 6,594,388 B1 * | 7/2003 | Gindele et al. | | 382/167 |
| 6,628,830 B1 * | 9/2003 | Yamazoe et al. | | 382/168 |
| 6,642,930 B1 * | 11/2003 | Matsuura et al. | | 345/601 |
| 6,647,141 B1 * | 11/2003 | Li | | 382/162 |
| 6,668,096 B1 * | 12/2003 | Yamamoto | | 382/254 |
| 6,694,051 B1 * | 2/2004 | Yamazoe et al. | | 382/167 |
| 6,728,428 B1 * | 4/2004 | Kinjo | | 382/309 |
| 6,771,323 B1 * | 8/2004 | Dean et al. | | 348/722 |
| 6,795,212 B1 * | 9/2004 | Ichikawa | | 358/1.9 |
| 6,864,915 B1 * | 3/2005 | Guimaraes et al. | | 348/222.1 |
| 6,868,190 B1 * | 3/2005 | Morton | | 382/278 |
| 6,897,880 B2 * | 5/2005 | Samra | | 345/619 |
| 6,919,924 B1 * | 7/2005 | Terashita | | 348/223.1 |
| 6,965,645 B2 * | 11/2005 | Zhang et al. | | 375/240.16 |
| 7,057,768 B2 * | 6/2006 | Zaklika et al. | | 358/1.9 |
| 7,088,388 B2 * | 8/2006 | MacLean et al. | | 348/234 |
| 7,110,604 B2 * | 9/2006 | Olsson | | 382/224 |
| 7,127,127 B2 * | 10/2006 | Jojic et al. | | 382/305 |
| 7,327,382 B2 * | 2/2008 | Rodriguez et al. | | 348/96 |
| 2001/0050708 A1 * | 12/2001 | Spence et al. | | 348/96 |
| 2002/0171668 A1 * | 11/2002 | Samra | | 345/619 |
| 2002/0186770 A1 * | 12/2002 | Jawerth et al. | | 375/240.12 |
| 2003/0002736 A1 * | 1/2003 | Maruoka et al. | | 382/168 |
| 2003/0099407 A1 * | 5/2003 | Matsushima | | 382/274 |
| 2003/0197710 A1 * | 10/2003 | Gonsalves et al. | | 345/600 |
| 2004/0022434 A1 * | 2/2004 | Yamazoe et al. | | 382/168 |
| 2004/0071343 A1 * | 4/2004 | Yamazoe et al. | | 382/167 |
| 2004/0071445 A1 * | 4/2004 | Tarnoff et al. | | 386/96 |
| 2004/0197022 A1 | 10/2004 | Gonsalves | | |
| 2005/0041159 A1 * | 2/2005 | Nakamura et al. | | 348/722 |
| 2005/0146615 A1 * | 7/2005 | Silverbrook et al. | | 348/207.2 |
| 2006/0133669 A1 * | 6/2006 | Manbeck et al. | | 382/162 |
| 2007/0046688 A1 * | 3/2007 | Gonsalves et al. | | 345/589 |

FOREIGN PATENT DOCUMENTS

| | | |
|---|---|---|
| WO | WO02/07426 | 1/2002 |

* cited by examiner

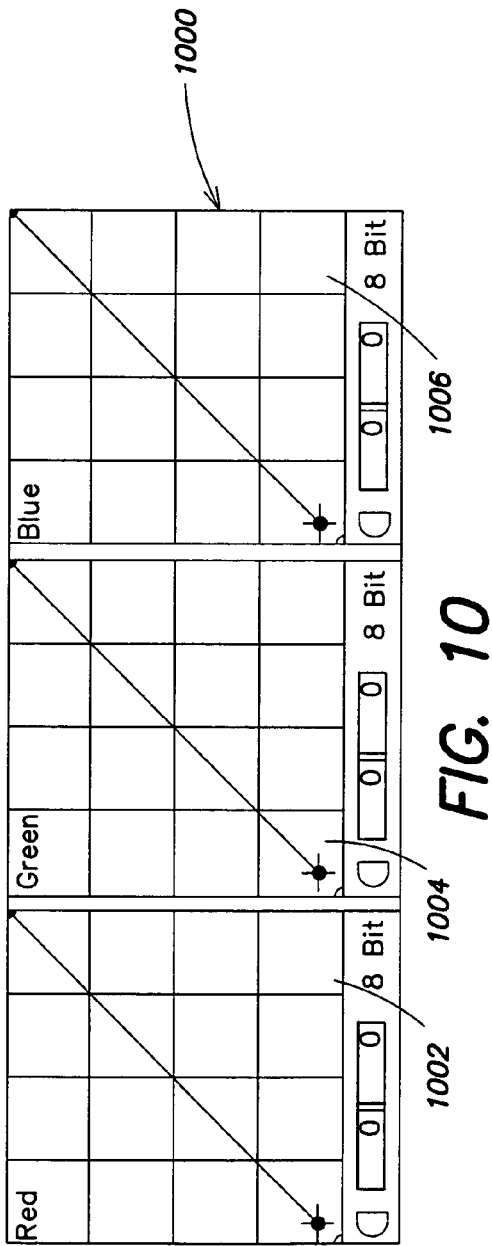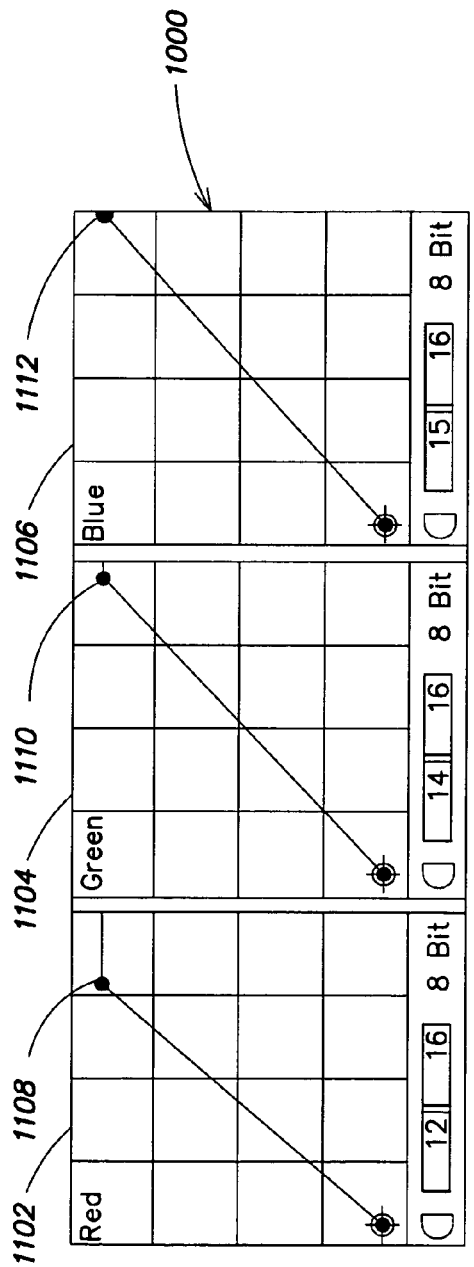

AUTOMATIC COLOR CORRECTION FOR SEQUENCES OF IMAGES

BACKGROUND

Images that are captured using a camera generally have several kinds of color problems. For example, if the camera is not properly white balanced, images tend to have a red or blue cast. If there is insufficient lighting in the scene, images tend to be dark and show little contrast. Also, if light reflects off objects in the scene, other objects tend to have a color cast associated with the reflected light.

These and other color problems commonly are fixed using color correction tools on a computer workstation. These tools allow a user to select one or more image processing functions to apply to an image and to adjust parameters of these functions. Currently available color correction tools are powerful, but tend to have a steep learning curve.

To reduce the learning curve and the time required to manipulate the image processing functions, there are some automatic tools for color correction. Such tools analyze an image and adjust parameters of a color correction operation to improve the color in the image. An example of such a tool is the PHOTOSHOP software from Adobe Systems Incorporated of Menlo Park, Calif. An example kind of function that may be provided is automatic color balancing. Using automatic color balancing, a histogram of the red, blue and green channels is created. The histogram is then stretched so that it matches the end points of the range of values for each channel or the minimum and maximum values from among the red, green and blue channels. Such automatic color balancing generally also improves the contrast of the image, which is generally desirable.

However, color correction for video, which is a sequence of images, is more complicated. Although it may be possible to analyze and correct separately every image in a sequence of images, such analysis and correction would consume significant processing resources. On the other hand, it may be undesirable to apply contrast modifications developed by analysis of one image to other images. A change in contrast in one image may not be appropriate to apply to another image. Also, the change in contrast to the other image may negatively impact its quality.

SUMMARY

Automatic color correction is applied to a scene or clip, including a sequence of images, in a motion picture by selecting a representative image of the scene, analyzing the image and adjusting parameters of a color correction operation that is performed on the sequence of images included in the scene. This operation can be repeated automatically for all scenes or for selected scenes in the motion picture. The parameters may be adjusted to automatically color balance the image while maintaining substantially constant contrast.

Analysis of the representative image may include identifying an offset of a peak in a two-dimensional histogram of the colors in the representative image from a white point. Parameters of a color correction operation are adjusted according to this offset. Separate histograms and offsets may be determined for shadows, midtones and highlight regions of the representative image.

Analysis of the representative image may include determining a one dimensional histogram of the luminance information in the representative image. The darkest level and the brightest level in the image are used to balance the image. In particular, the histograms for color channels in the image, such as red, green and blue, are adjusted to match the darkest level and brightest level identified by the luminance histogram.

Accordingly, in one aspect, a method, computer program product and system are provided for automatic color correction of a sequence of images. An indication of one or more representative images in the sequence of images is received. Characteristics of the one or more representative images are analyzed. Parameters for a color correction operation are determined according to the analyzed characteristics of the one or more representative images. The color correction operation is applied with the determined parameters to the sequence of images.

In another aspect, a method, computer program product and system are provided for analyzing characteristics of one or more representative images from a sequence of images. A two-dimensional histogram of colors in the representative image is generated, wherein the two-dimensions include a white point. An offset between a peak value in the two-dimensional histogram and the white point is determined.

In another aspect, a method, computer program product and system are provided for analyzing characteristics of one or more representative images from a sequence of images. A histogram of luminance in the representative image is generated, whereby the histogram indicates a darkest value and a brightest value. Adjustments to histograms of colors in the representative image are determined so as to match a darkest value and a brightest value for each color to the darkest value and brightest value for the luminance.

In another aspect, a system is provided for automatic color correction of a sequence of images. The system includes an image analyzer having an input for receiving an indication of one or more representative images in the sequence of images and an output for providing information indicative of characteristics of the one or more representative images. A parameter calculator has an input for receiving the information indicative of characteristics of the one or more representative images and an output for providing parameters for a color correction operation according to the analyzed characteristics of the one or more representative images. A color corrector has a first input for receiving the parameters and a second input for receiving the sequence of images and an output for providing the sequence of images color corrected according to the determined parameters.

In another aspect, a method, computer program product and system is provided for automatic color correction of a sequence of clips of video information. An indication of a representative image for each clip in the sequence is received. Characteristics of the representative image for each clip are analyzed. Parameters for a color correction operation for each clip are determined according to the analyzed characteristics of the representative image for the clip. The color correction operation with the parameters determined for the clip is applied to each clip.

BRIEF DESCRIPTION OF THE DRAWINGS

FIG. 10 illustrates a curves interface for setting color correction parameters.

FIG. 11 illustrates the curves interface of FIG. 10 with color correction parameters set.

DETAILED DESCRIPTION

Figure 1:
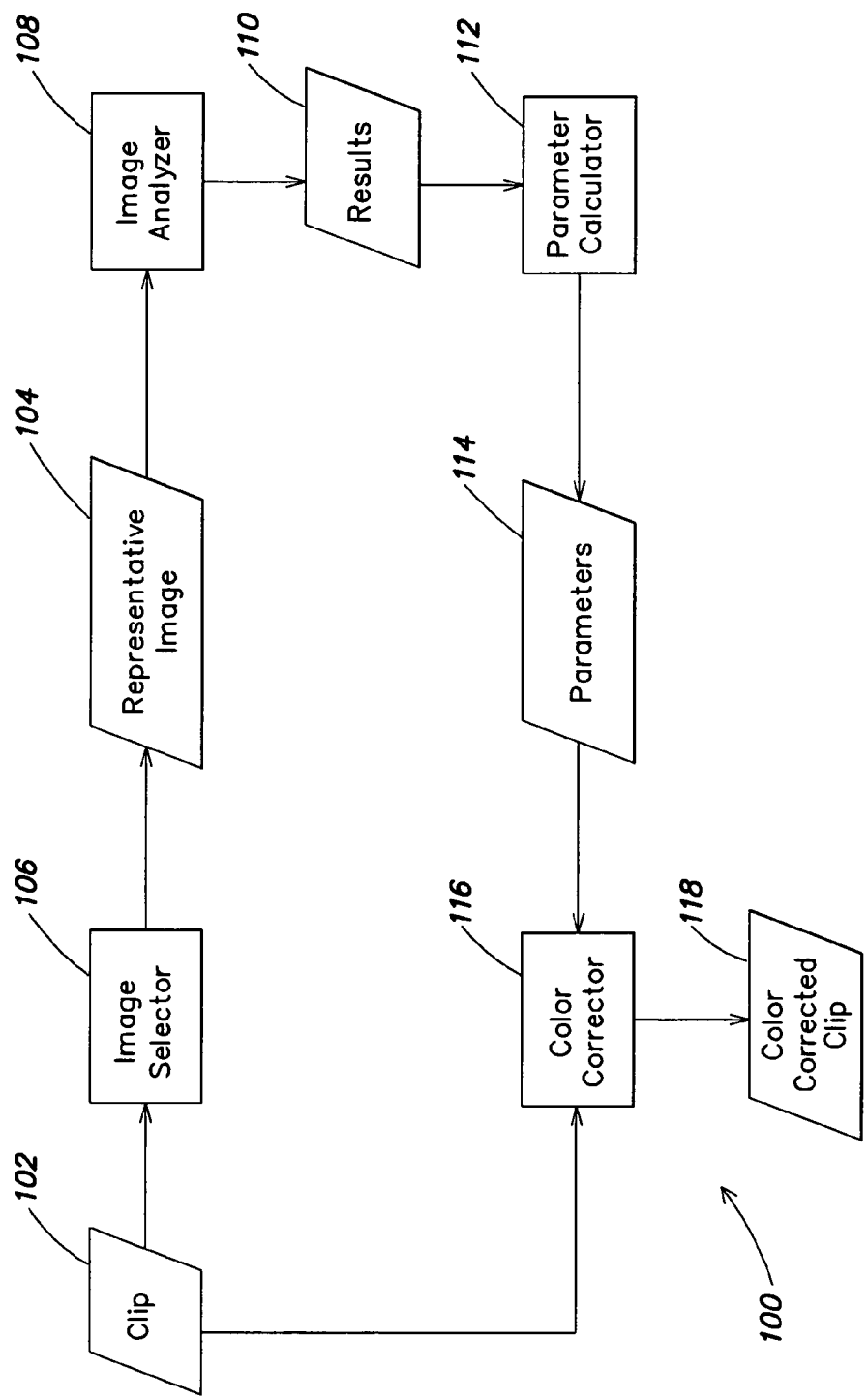
FIG. 1 is a data flow diagram of an example system that performs automatic color correction on a clip of a motion picture.

Referring now to FIG. 1 a data flow diagram of an example system 100 that performs automatic color correction on a clip of a motion picture will now be described. A clip 102 represents a sequence of images. Typically, the sequence of images is stored in a data file. The clip references the data file and a range of images within the data file to define what images are part of the clip in the motion picture. A motion picture is generally defined by a sequence of such clips.

To perform automatic color correction on a clip 102, one or more representative images 104 from among the images in the clip 102 is selected by an image selector 106. There are a variety of ways that the representative images 104 may be selected by the image selector 106. For example, but not limited to these examples, an image may be selected from the middle of the clip. Every n-th image in the sequence may be selected. Every image in the clip also may be selected.

The representative image is input to an image analyzer 108. The image analyzer produces results 110 that are used by a parameter calculator 112 to determine what parameters 114 to use for color correction. The image analyzer may generate, for example, but not limited to, a two-dimensional chrominance histogram (in a manner described below) or a one-dimensional luminance histogram (in a manner described below). The parameter calculator may determine, for example, but not limited to, an offset between a peak in a chrominance histogram and a white point from which a corresponding offset for a color correction operation can be determined (in a manner described below).

Given the determined parameters 114 for an appropriate color correction operation, a color corrector 116 uses those parameters and applies the color correction operation to all of the images in the clip 102. The color corrector thus produces the color corrected clip 118.

Figure 2:
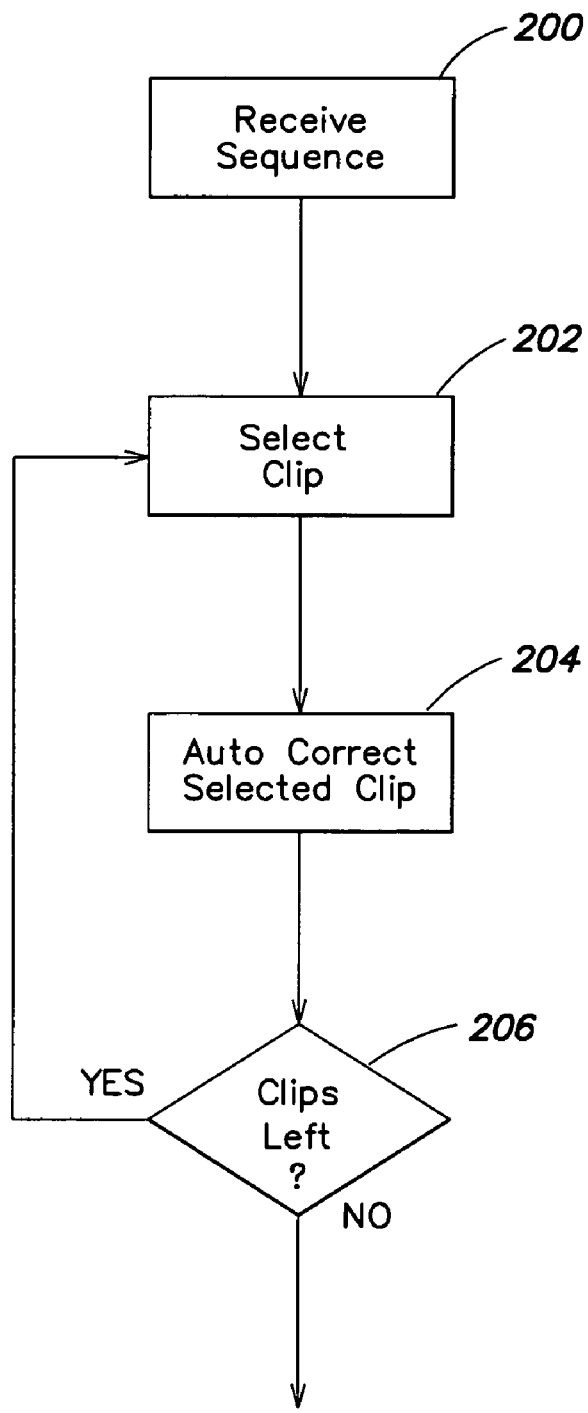
FIG. 2 is a flow chart describing how automatic color correction may be performed on a set of clips.

Referring now to FIG. 2, a flow chart describing how automatic color correction may be performed on a set of clips, such as a sequence or clips or a selected set of clips, will now be described. The process involves receiving (200) the set of clips. One of the clips is selected (202). The selected clip is automatically corrected (204), using the process described in connection with FIG. 1. After the selected clip is corrected, if any clips in the received set remain, as determined at 206, then the next clip is selected (202) and the process is repeated. Such automatic correction of a set of clips enables, for example, an editing system to automatically process and correct a sequence of clips, perhaps even all clips in a program that is being edited.

An example technique for analyzing an image and generating color correction parameters will now be described in connection with FIGS. 3-7. This technique uses a two-dimensional chrominance histogram of the representative image and determines an offset of a peak in the histogram from a white point. The inverse of this offset may be applied to and displayed by, for example but not limited to, color wheels for each of shadow, midtone and highlight regions of an image.

Figure 3:
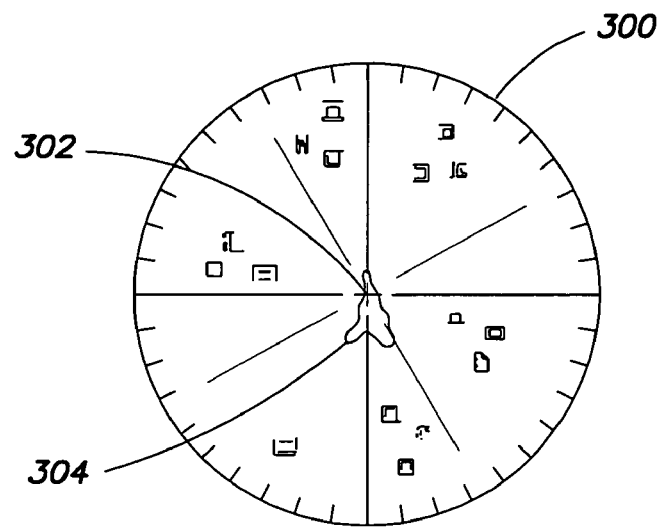
FIG. 3 illustrates a vectorscope histogram display of an example input image.
Figure 4:
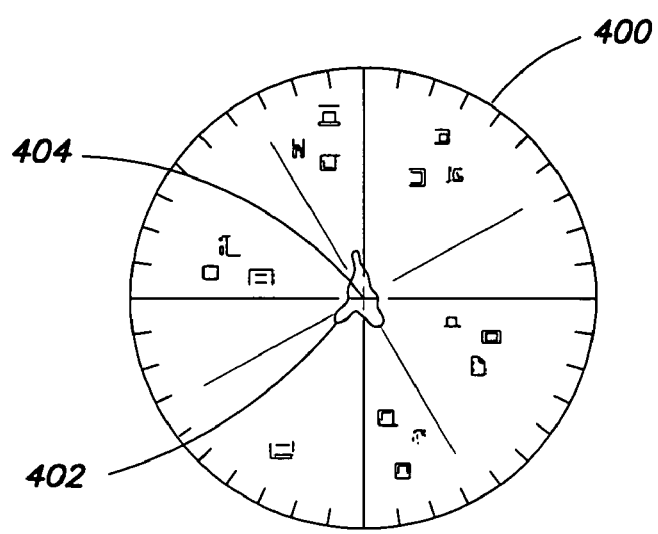
FIG. 4 illustrates a vectorscope histogram display of an output image after automatic correction.

FIG. 3 illustrates a vectorscope histogram display of an input image. In this display, the vectorscope 300 has a white point 302 at the center of the display. The vectorscope provides a two-dimensional histogram of the colors in the image, as indicated by 304. An approximate center of this histogram, however, is notably offset from the center 302 of the vectorscope and represents a color cast in the image. To correct this image, the vectorscope histogram of the corrected image would appear as shown in FIG. 4. Notably, the histogram 402 in the vectorscope 400 in FIG. 4 is approximately centered on the white point 404.

Figure 5:
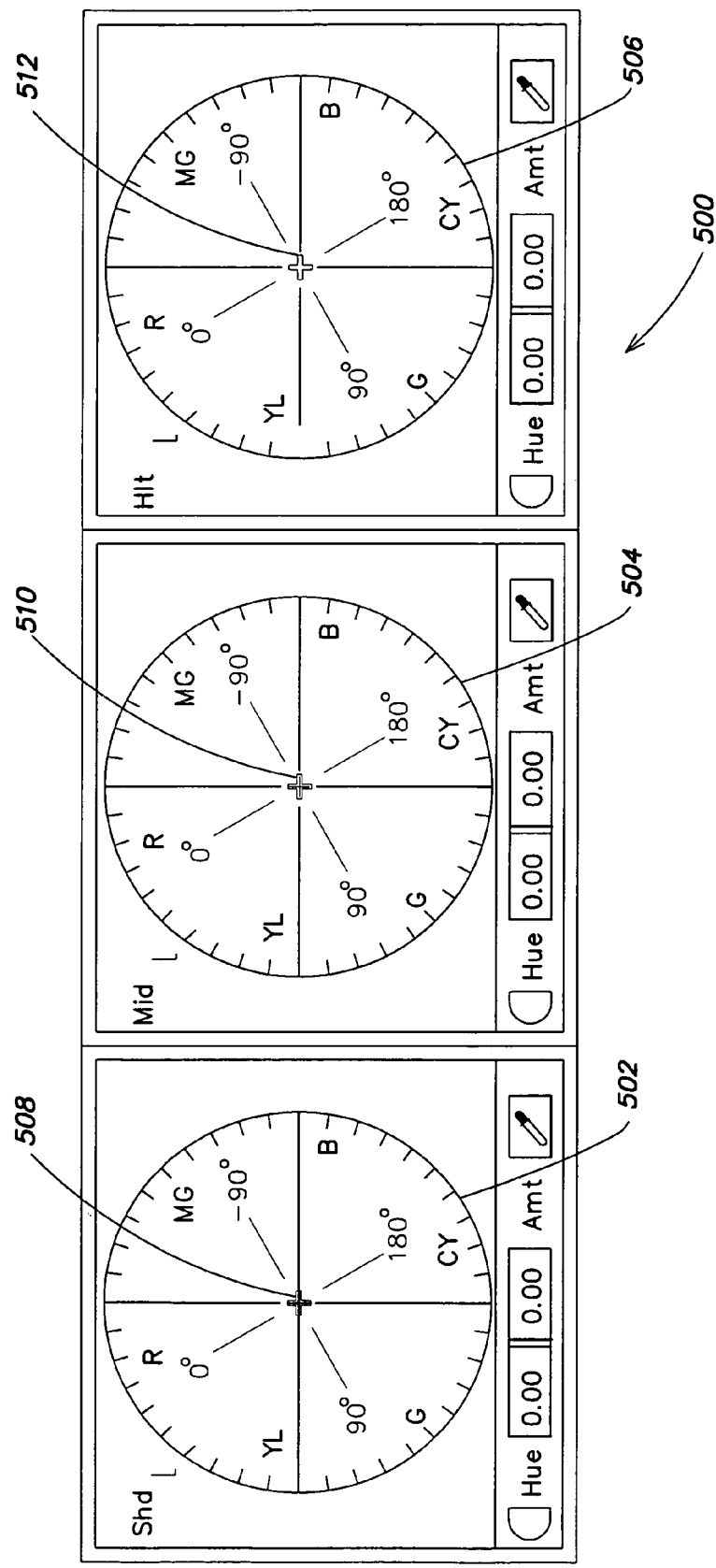
FIG. 5 illustrates a color wheel interface for setting color correction parameters.

One way to correct an image is to use hue offsets (as specified using color wheels) as shown in the color wheel interface 500 of FIG. 5. This interface includes a color wheel 502 for shadow regions of an image, a color wheel 504 for midtone regions of the image and a color wheel 506 for highlight regions of an image. There are a variety of ways for specifying the shadow, midtone and highlight regions, and the invention is not limited thereby. The initial settings of the hue offsets on the color wheels, shown in FIG. 5, are zero, or no offset, and the crosshairs 508, 510 and 512 are at the centers of the respective color wheels 502, 504 and 506.

Figure 6:
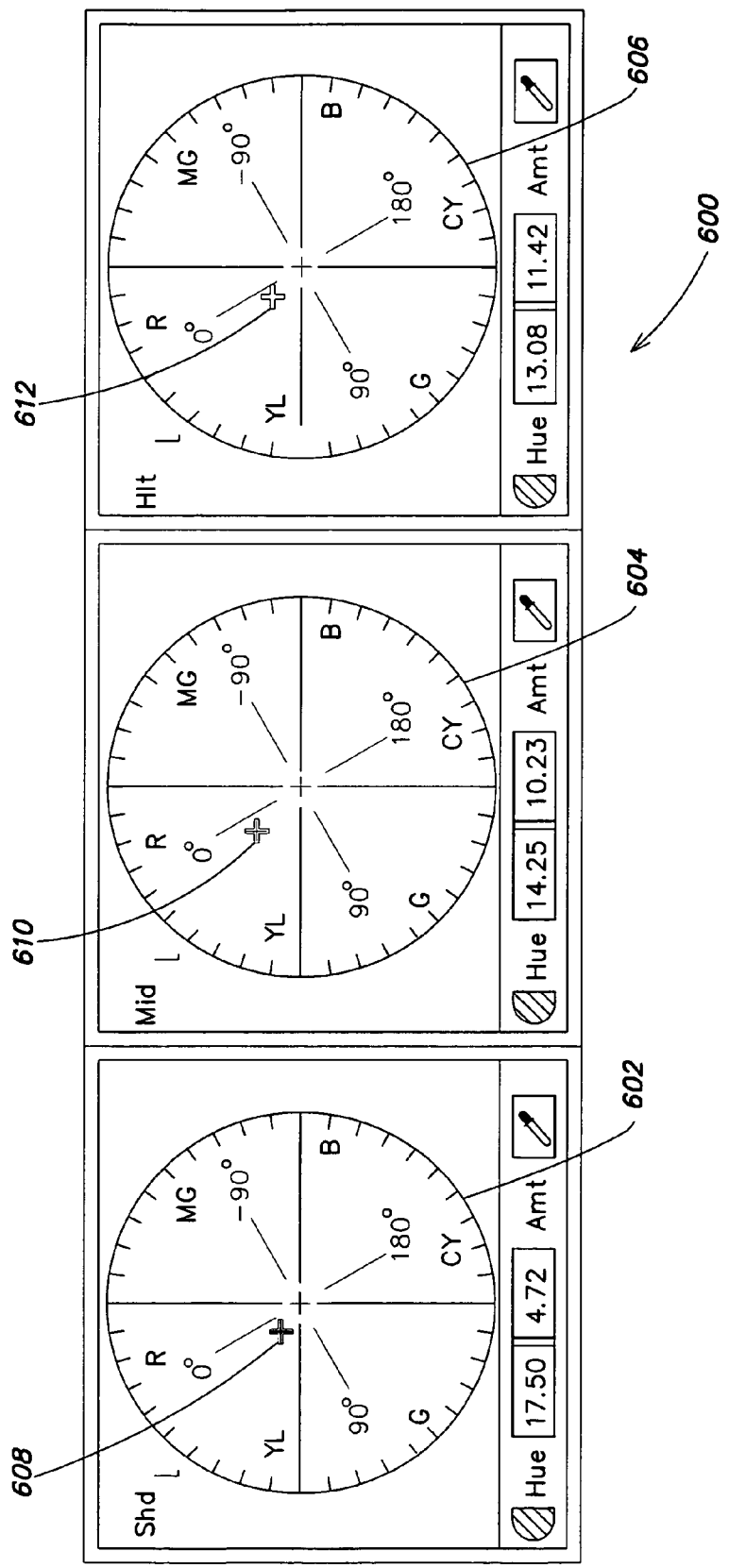
FIG. 6 illustrates the color wheel interface of FIG. 5 with color correction parameters set.

FIG. 6 illustrates a color wheel interface 600 with color correction parameters set to provide the correction that is illustrated by the vectorscope display in FIG. 4. The corrected settings of the hue offsets on the color wheels, shown in FIG. 6, are represented by the crosshairs 608, 610 and 612 which are at an offset from the centers of the respective color wheels 602, 604 and 606. Notably, the offset between the center of the histogram in the vectorscope of FIG. 3 and the white point is approximately the opposite direction and same magnitude of the hue offsets shown in FIG. 6. How such hue offsets are determined will now be described in connection with FIG. 7.

Figure 7:
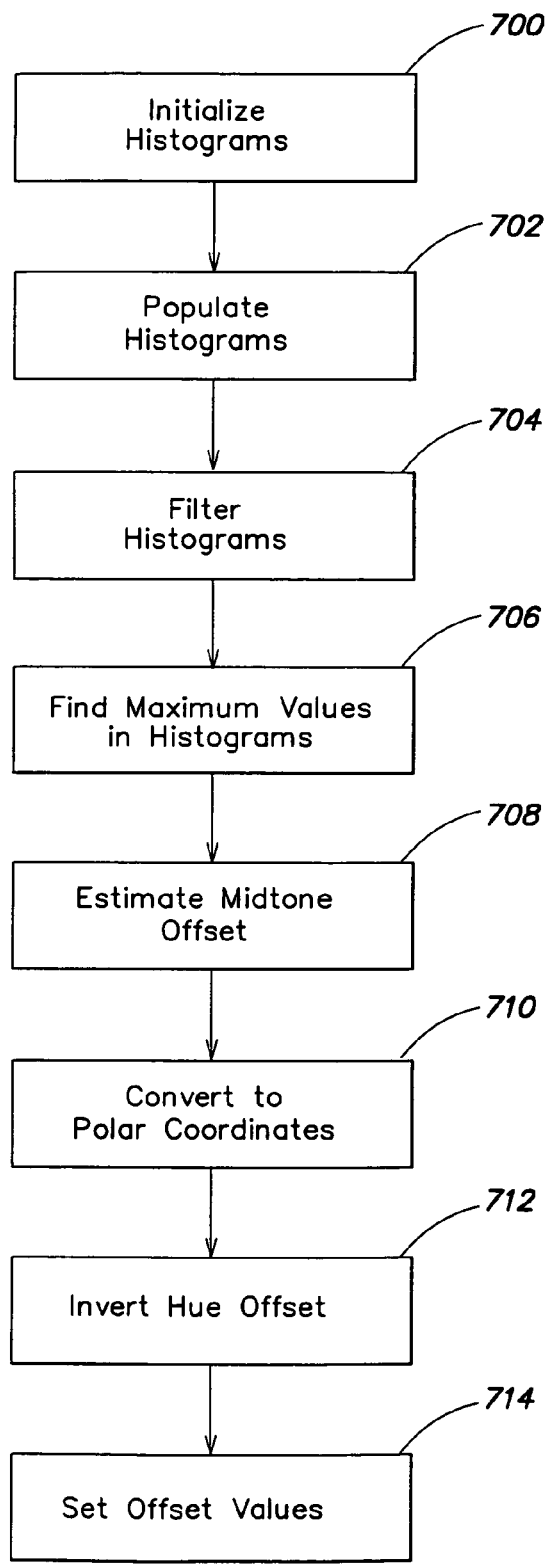
FIG. 7 illustrates is a flowchart describing how a two-dimensional chrominance histogram of an image may be used to set color correction parameters.

FIG. 7 illustrates is a flowchart describing how a two-dimensional chrominance histogram of an image may be used to set color correction parameters. Experimentation has revealed that a histogram for midtone values can be unreliable. Histograms are developed only for shadow and highlight values and a correction parameter for midtones is derived from the correction parameters for shadows and highlights.

In FIG. 7, shadow and highlight histograms are initialized (700) to zero. In particular, each value in a two-dimensional array indexed by the Cr, Cb values of a pixel is set to zero. Two such arrays are initialized, one for shadows and one for highlights. Each histogram is then populated (702) with the pixel values from the image. Each pixel value is converted to Y, Cr, Cb components, and the Cr, Cb components are used to access the arrays for both shadows and highlights. In general a histogram is simply a count of values. Instead of merely incrementing a count for the Cr, Cb value of the pixel, the luminance component (y) is used to weight the value added to the histogram. In general, a weight can be assigned to each luminance value y for each of the shadows, midtones and highlights. The weight should be a high value if the luminance value y indicates that the pixel is strongly in a shadow, midtone or highlight region. The weight should be a low value if the luminance value y indicates that the pixel is not strongly in the shadow, midtone or highlight region. In one implementation, the weight for the shadow histogram is 255-y and the weight for the highlight histogram is y.

After the shadow and highlight histograms are created for the representative image, they may be filtered (704) to reduce the likelihood that noise affects the determination of the offset. Such a filter may be, for example but not limited to, a low-pass filter such as a three-by-three tent filter. Filtering also may be performed based on the distance of a pixel from the center. For example, each value for each cell in each two-dimensional histogram may be scaled by the sum of one less the distance from the center. Such filtering helps limit the effect of a large colored object in the image on the histogram.

After the shadow and highlight histograms are filtered, the Cr and Cb values corresponding to the largest value in each histogram are identified (706). These pairs of values (herein called Cr_shadow, Cb_shadow and Cr_highlight, Cb_highlight) represent the offset of the colors in the image from a white point for the shadow and highlight regions of the image. The midtone offset (Cr_midtone, Cb_midtone) may be estimated (708) from the offsets of the shadows and highlights. This offset may be estimated by, for example but not limited to, summing the shadow offset with the highlight offsets. In particular, Cr_midtone=Cr_shadow+Cr_highlight and Cb_midtone=Cb_shadow+Cb_highlight.

These offsets are then converted to color correction parameters, depending on the color correction operation to be performed. For example, but not limited to this example, the color correction operations may be a hue offset applied to each of the luminance regions of shadows, midtones and highlights. Such offsets may be applied through and/or displayed in, for example but not limited to, a color wheel interface such as shown in FIGS. 5 and 6. In automatic color correction of multiple clips the user interface, such as the color wheels, may be hidden from the user. To convert the offsets to hue and saturation adjustments, the offsets are first converted (710) to polar coordinates to obtain the hue (an angle) and saturation (a magnitude) that correspond to each pair of Cr and Cb offset values. The hue is then inverted (712). For example, if the hue is represented in degrees, then 180 is added to the hue. The offsets for the color correction operation are then set (714) to the computed saturation and inverted hue.

This particular form of color correction maintains the luminance substantially constant. The nonlinearity of the color correction operations performed using hue offsets on luminance regions may introduce a slight change in luminance.

Another example technique for analyzing an image and generating color correction parameters will now be described in connection with FIGS. 8-12. This technique uses a one-dimensional luminance histogram of the representative image and determines the maximum and minimum luminance values. The red, green and blue channel values are then stretched and translated so that the minimum values for red, green and blue channels match the minimum and maximum luminance values. These values may be applied through and/or displayed by, for example but not limited to, a curves interface that operates on red, green and blue channels, or on a levels interface (not shown).

Figure 8:
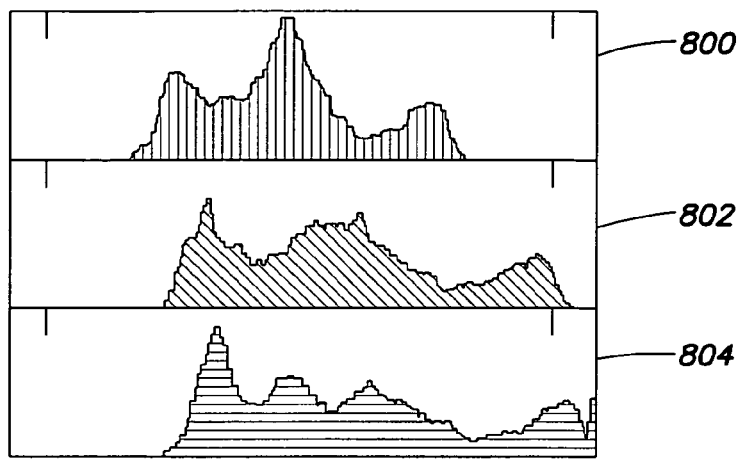
FIG. 8 illustrates red, green and blue channel histograms of an example input image.

FIG. 8 illustrates red, green and blue channel histograms of an example input image. In this display, a histogram 800, 802 and 804 is provided, respectively for each of the red, green and blue channels. The histogram provides a one-dimensional histogram of each channel that defines the image. Each histogram indicates a number (by the y-axis) of pixels having a particular value (x-axis) for the corresponding component. In the green and blue histograms in FIG. 8, a significant number of values exceed the highest legal value, and also are significantly higher than the red values. Therefore, a blue and green color cast can be expected.

Figure 9:
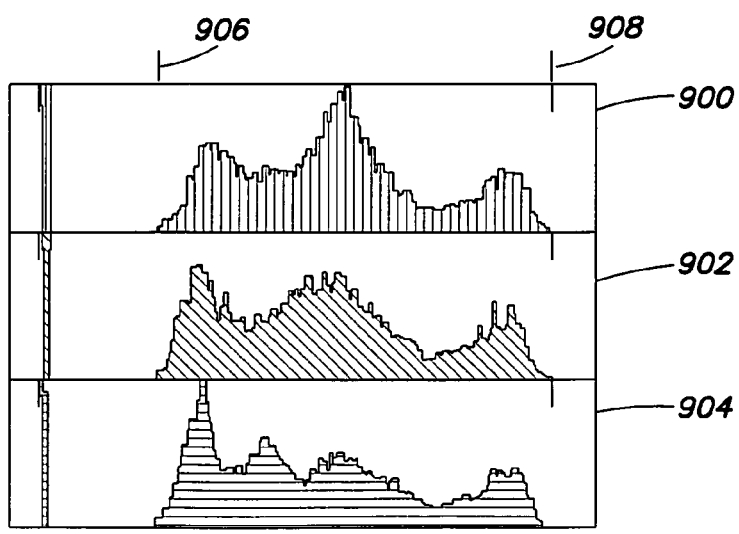
FIG. 9 illustrates red, green and blue channel histograms of an output image after automatic correction.

To correct only the color balance in this image, without modifying the contrast, the histogram of each channel 900, 902 and 904 would appear as shown in FIG. 9. FIG. 9 illustrates red, green and blue channel histograms of an output image after automatic correction. Notably, each histogram in FIG. 9 has the same maximum and minimum values, as shown at 906 and 908 respectively. As described in more detail below, these minimum and maximum values 906 and 908 are determined according to the minimum and maximum values of a luminance histogram of the image.

One way to correct such an image is to use curves that map input values of a channel to new output values of the same channel, for example by using a curves interface 1000 as shown in FIG. 10. This interface includes a curve 1002 for the red channel, a curve 1004 for the green channel and a curve 1006 for the blue channel. The initial settings for the curves, shown in FIG. 10, provide an identity mapping.

Curves allow a user to manipulate one or more function curves that adjust individual components of pixels of an image, such as red, green, blue components. One or more points may be added to the curve, or may be moved, to modify the function that it performs. Thus, the curves allow a user to perform a mathematically nonlinear adjustment to a color component. These curves are particularly useful for color correction because a large number of color problems in an image are nonlinear problems created at the time of acquisition of the image, and these problems are typically introduced in the red, green and blue components of pixels of the image.

FIG. 11 illustrates the curves interface of FIG. 10 with color correction parameters set to provide the correction that is illustrated by the histograms in FIG. 10. The corrected settings for the histograms, shown in FIG. 11, are represented by the points 1108, 1110 and 1112 of the curves 1102, 1104 and 1106, respectively, which are at an offset from the original endpoints of those curves in FIG. 10. How such modifications to the curves are determined will now be described in connection with FIG. 12.

Figure 12:
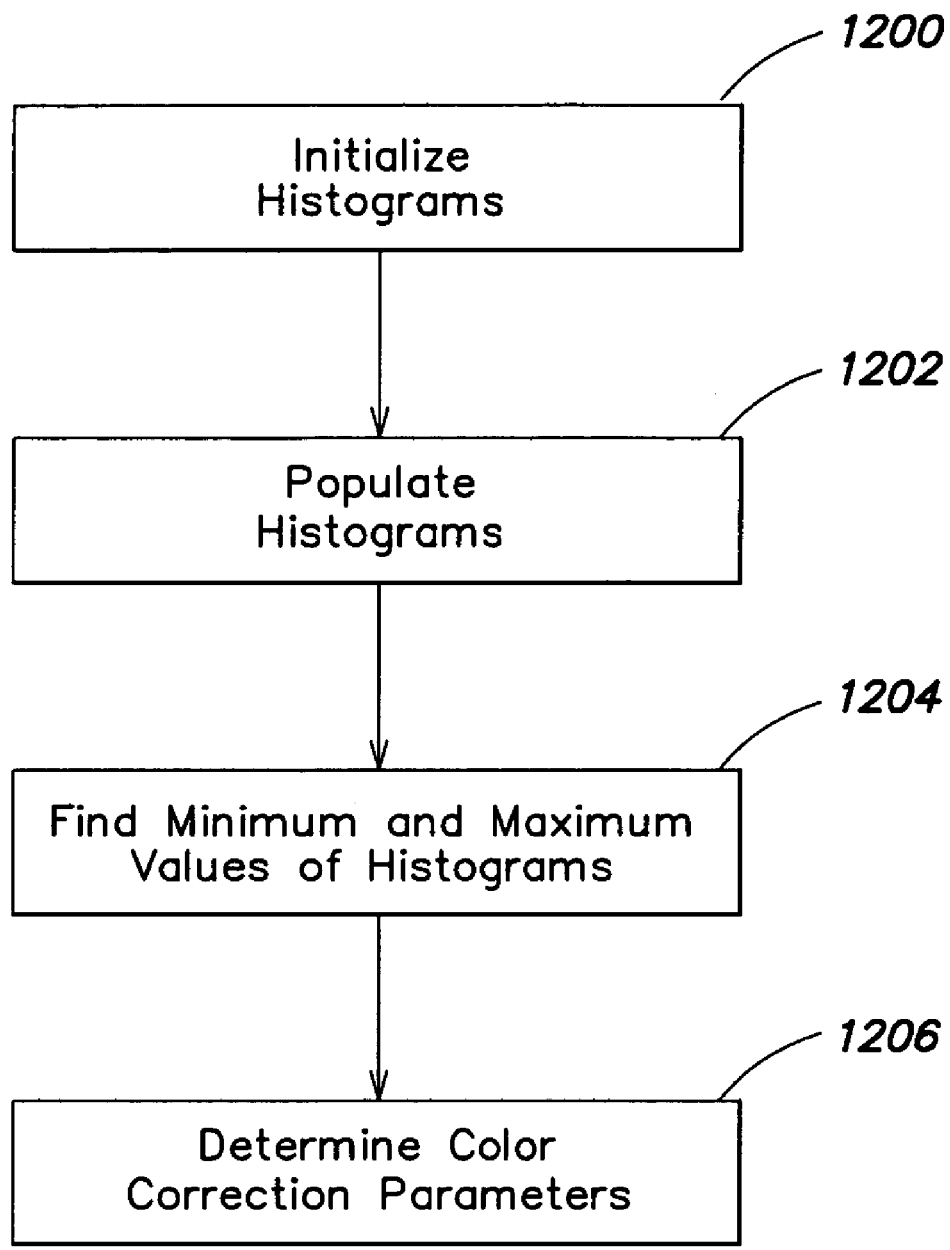
FIG. 12 illustrates is a flowchart describing how a one-dimensional luminance histogram of an image may be used to set color correction parameters.

FIG. 12 illustrates is a flowchart describing an example process for how a one-dimensional luminance histogram of an image may be used to set color correction parameters. Histograms for the red, green and blue channels and for luminance are initialized (1200). In particular, each value in a one-dimensional array, indexed by the possible values for each channel, or for luminance, is set to zero. Four such arrays are initialized, one for the red channel, one for the green channel, one for the blue channel and one for luminance. Each histogram is then populated (1202) with the pixel values from the image. If the input image is represented using red, green and blue values, the luminance value is computed for each pixel. These histograms represent a count of each pixel having a particular value for red, green, blue and luminance, and are not weighted.

After generating the histograms, the minimum value and maximum value for each histogram is determined (1204). That is, the lowest red, green, blue and luminance value for which there is a pixel is identified. Also, the largest red, green, blue and luminance value for which there is a pixel also is identified. The minimum value and maximum value may be forced to correspond to a certain minimum number of pixels to avoid an anomalous pixel from causing an incorrect minimum or maximum to be obtained.

Given the minimum and maximum values for each of the red, green and blue channels and luminance, the color correction parameters may be determined 1206. For example, if the color correction operations is performed using curves, a slope and offset defining the curve for each channel is determined using the minimum and maximum values of the channel and the minimum and maximum luminance values. In particular, the following set of equations (Equation 1) may be used:

RedSlope=(LumMax−LumMin)/(RedMax−RedMin)

RedOffset=LumMin−RedSlope*RedMin

GreenSlope=(LumMax−LumMin)/(GreenMax−GreenMin)

GreenOffset=LumMin−GreenSlope*GreenMin

BlueSlope=(LumMax−LumMin)/(BlueMax−BlueMin)

BlueOffset=LumMin−BlueSlope*BlueMin

These values may be used to create look up tables for performing the color correction operation.

In the processes of FIGS. 7 and 12, it may be desirable to analyze an image, for example, generate a histogram, with only a portion of the image data. For example, image data in certain spatial or color ranges may be excluded. A test can be performed to determine if a pixel is in an excluded spatial or color range, and if the pixel is to be excluded from analysis it is not added to the histograms used in FIG. 7 or 12. A color range that may be excluded includes, but is not limited to, illegal or clipped values. A color range that is selected by a user, such as by manual specification or by specifying an image processing operation, also may be excluded from analysis. A spatial range that may be excluded includes, but is not limited to, the edges of the image, such as an 8-pixel boundary on the left, top, right and bottom of the image. Such a boundary eliminates black lines at the top and bottom and ramped values at the left and right sides of an image, which are typically found in a number of video formats. A spatial area that is selected by a user, such as by manual specification or by specifying an image processing operation, also may be excluded from analysis. Such spatial and color ranges also may be excluded from color correction as well as from the analysis.

A percentage value, between zero percent and one hundred percent, also can be used to control the extent of the changes through automatic balancing. A user interface could be provided for allowing a user to specify a percentage amount of balancing to be performed. The percentage value would limit the hue offset and saturation or curve slope and offset that are computed as the color correction parameters. For example, the RedMin, RedMax, GreenMin, GreenMax, BlueMin and Blue Max values may be adjusted prior to utilizing Equation 1, above, by the following set of equations (Equation 2), given a value (AB) between 0 and 1:

RedMin=$AB$*RedMin+(1−$AB$)*LumMin

GreenMin=$AB$*GreenMin+(1−$AB$)*LumMin

BlueMin=$AB$*BlueMin+(1−$AB$)*LumMin

RedMax=$AB$*RedMax+(1−$AB$)*LumMax

GreenMax=$AB$*GreenMax+(1−$AB$)*LumMax

BlueMax=$AB$*BlueMax+(1−$AB$)*LumMax

By using these kinds of operations for automatic balancing, the luminance and thus the contrast in the image remains substantially the same. Thus, a separate control for contrast adjustment may be combined with this automatic balancing.

As one example, a master curve interface may be provided in the interface of FIGS. 10 and 11. The master curve allows the user to manipulate simultaneously all of the components of an image with a single function curve. A change to the master curve that would result in maximizing the breadth of all of the red, blue and green channel histograms would maximize the contrast of an image. Therefore, in addition to computing the changes to the red, green and blue curves, a change to the master curve can be computed. A percentage value can be used to control the amount of this change between zero percent and one hundred percent. The percentage could be a 50% contrast change, for example. A user interface could be provided for allowing a user to specify a percentage amount of contrast change. For example, such a percentage value (AC) that varies between 0 and 1 may be used to modify the LumaMin and LumaMax values used in Equations 1 and 2, above, using the following set of equations (Equation 3):

LumMin=$AC$*LumMin+(1−$AC$)*LumMinLimit; and

LumMax=$AC$*LumMax+(1−$AC$)*LumMaxLimit, where LumaMinLimit and LumaMaxLimit represent the limit of the range of legal values for luminance, and typically are 16 and 235 respectively.

A user interface could be provided to allow a user to set a percentage for both of the automatic balancing and automatic contrast adjustment, which could be treated as a default value for an automatic correction operation.

A user interface also could be provided to allow a user to cycle through viewing a clip using different amounts of balancing and/or contrast. For example, a user interface may have a button for performing an automatic correction function. If the button is pressed multiple times on the same clip, each time would perform the automatic correction function with a different percentage of correction. For example, automatic correction could cycle through 100%, 75%, 50%, 25% and then no correction.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, a cathode ray tube (CRT) display, liquid crystal displays (LCD) and other video output devices, printers, communication devices such as a modem, and storage devices such as disk or tape. One or more input devices may be connected to the computer system. Example input devices include, but are not limited to, a keyboard, keypad, track ball, mouse, pen and tablet, communication device, and data input devices. The invention is not limited to the particular input or output devices used in combination with the computer system or to those described herein.

The computer system may be a general purpose computer system which is programmable using a computer programming language, such as "C++," Visual Basic, JAVA or other language, such as a scripting language or even assembly language. The computer system may also be specially programmed, special purpose hardware. In a general-purpose computer system, the processor is typically a commercially available processor, such as various processors available from Intel, AMD, Cyrix, Motorola, and IBM. The general-purpose computer also typically has an operating system, which controls the execution of other computer programs and provides scheduling, debugging, input/output control, accounting, compilation, storage assignment, data management and memory management, and communication control and related services. Example operating systems include, but are not limited to, the UNIX operating system and those available from Microsoft and Apple Computer.

A memory system typically includes a computer readable medium. The medium may be volatile or nonvolatile, writeable or nonwriteable, and/or rewritable or not rewriteable. A memory system stores data typically in binary form. Such data may define an application program to be executed by the microprocessor, or information stored on the disk to be processed by the application program. The invention is not limited to a particular memory system.

A system such as described herein may be implemented in software or hardware or firmware, or a combination of the three. The various elements of the system, either individually or in combination may be implemented as one or more computer program products in which computer program instructions are stored on a computer readable medium for execution by a computer. Various steps of a process may be performed by a computer executing such computer program instructions. The computer system may be a multiprocessor computer system or may include multiple computers connected over a computer network. The components shown in FIG. 1 may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications are within the capabilities of one of ordinary skill in the art and are contemplated as falling within the scope of the invention.

What is claimed is:

1. A method for automatic color correction of a motion picture comprising a sequence of scenes, wherein each scene comprises a sequence of images, in a nonlinear video editing system, comprising:
   the nonlinear video editing system receiving, for each scene in the motion picture, an indication of one or more representative images in the sequence of images of the scene;
   the nonlinear video editing system analyzing characteristics of the one or more representative images;
   the nonlinear video editing system determining parameters for a color correction operation for each scene according to the analyzed characteristics of the one or more representative images for the scene; and
   the nonlinear video editing system applying the color correction operation with the determined parameters for each scene to the sequence of images of the scene including images other than the one or more representative images.

2. The method of claim 1, wherein analyzing characteristics of the representative image comprises:
   generating a two-dimensional histogram of colors in the representative image, wherein the two-dimensional histogram includes a white point and
   determining an offset between a peak value in the two-dimensional histogram and the white point.

3. The method of claim 2, wherein determining parameters comprises:
   using the determined offset to determine an offset for color correction of the image.

4. The method of claim 3, wherein generating the two-dimensional histogram comprises:
   for each pixel, determining a weighting for the pixel with respect to its classification as a shadow or highlight; and
   generating a two-dimensional histogram for each of shadows and highlights using the determined weightings for each pixel.

5. The method of claim 4, wherein determining parameters comprises:
   using the determined offset for shadows to determine an offset for color correction of shadows;
   using the determined offset for highlights to determine an offset for color correction of highlights; and
   using the determined offsets for shadows and highlights to determine an offset for color correction of midtones.

6. The method of claim 1, wherein analyzing characteristics of the representative image comprises:
   generating a histogram of luminance in the representative image, whereby the histogram indicates a darkest value and a brightest value.

7. The method of claim 6, wherein determining parameters comprises:
   determining adjustments to histograms of colors in the representative image to match a darkest value and a brightest value for each color to the darkest value and brightest value for the luminance.

8. The method of claim 1, wherein receiving an indication of one or more representative images for a scene comprises the nonlinear video editing system selecting the one or more representative images for the scene according to an analysis of the scene.

9. A computer program product, comprising:
   a computer readable medium;
   computer program instructions stored on the computer readable medium that, when executed by a computer, configure the computer as a nonlinear video editing system providing automatic color correction of a motion picture comprising a sequence of scenes, wherein each scene comprises a sequence of images, comprising:
   the nonlinear video editing system receiving, for each scene in the motion picture, an indication of one or more representative images in the sequence of images of the scene;
   the nonlinear video editing system analyzing characteristics of the one or more representative images;
   the nonlinear video editing system determining parameters for a color correction operation for each scene according to the analyzed characteristics of the one or more representative images for the scene; and
   the nonlinear video editing system applying the color correction operation with the determined parameters for each scene to the sequence of images of the scene including images other than the one or more representative images.

10. The computer program product of claim 9, wherein analyzing characteristics of the one or more representative images comprises:

generating a two-dimensional histogram of colors in the representative image, wherein the two-dimensional histogram includes a white point and determining an offset between a: peak value in the two-dimensional histogram and the white point.

11. The computer program product of claim 10, wherein determining parameters comprises:

using the determined offset to determine an offset for color correction of the image.

12. The computer program product of claim 11, wherein generating the two-dimensional histogram comprises:

for each pixel, determining a weighting for the pixel with respect to its classification as a shadow or highlight; and generating a two-dimensional histogram for each of shadows and highlights using the determined weightings for each pixel.

13. The computer program product of claim 12, wherein determining parameters comprises:

using the determined offset for shadows to determine an offset for color correction of shadows;

using the determined offset for highlights to determine an offset for color correction of highlights; and using the determined offsets for shadows and highlights to determine an offset for color correction of midtones.

14. The computer program product of claim 9, wherein analyzing characteristics of the one or more representative images comprises:

generating a histogram of luminance in the representative image, whereby the histogram indicates a darkest value and a brightest value.

15. The computer program product of claim 14, wherein determining parameters comprises:

determining adjustments to histograms of colors in the representative image to match a darkest value and a brightest value for each color to the darkest value and brightest value for the luminance.

16. The computer program product of claim 9, wherein receiving an indication of one or more representative images for a scene comprises the nonlinear video editing system selecting the one or more representative images for the scene according to an analysis of the scene.

17. A nonlinear video editing system providing automatic color correction of a motion picture comprising a sequence of scenes, wherein each scene comprises a sequence of images, comprising:

an image analyzer having an input for receiving, for each scene, an indication of one or more representative images in the sequence of images of the scene and an output for providing information indicative of characteristics of the one or more representative images;

a parameter calculator having an input for receiving the information indicative of characteristics of the one or more representative images for each scene and an output for providing parameters for a color correction operation for each scene according to the analyzed characteristics of the one or more representative images for the scene; and a color corrector having a first input for receiving the parameters for the color correction operation for each scene and a second input for receiving the sequence of images for the scene, including images other than the representative images, and an output for providing the sequence of images for each scene, color corrected according to the determined parameters for the scene.

18. The system of claim 17, wherein the image analyzer having an input for receiving an indication of one or more representative images comprises:

means for generating a two-dimensional histogram of colors in the representative image, wherein the two-dimensional histogram includes a white point and means for determining an offset between a peak value in the two-dimensional histogram and the white point.

19. The system of claim 18, wherein the parameter calculator comprises:

means for using the determined offset to determine an offset for color correction of the image.

20. The system of claim 19, wherein generating the two-dimensional histogram comprises:

for each pixel, determining a weighting for the pixel with respect to its classification as a shadow or highlight; and generating a two-dimensional histogram for each of shadows and highlights using the determined weightings for each pixel.

21. The system of claim 20, wherein the parameter calculator comprises:

means for using the determined offset for shadows to determine an offset for color correction of shadows;

means for using the determined offset for highlights to determine an offset for color correction of highlights; and means for using the determined offsets for shadows and highlights to determine an offset for color correction of midtones.

22. The system of claim 17, wherein the image analyzer having an input for receiving an indication of one or more representative images comprises:

means for generating a histogram of luminance in the representative image, whereby the histogram indicates a darkest value and a brightest value.

23. The system of claim 22, wherein the parameter calculator comprises:

means for determining adjustments to histograms of colors in the representative image to match a darkest value and a brightest value for each color to the darkest value and brightest value for the luminance.

24. The nonlinear video editing system of claim 17, further comprising an analyzer having an input for receiving the sequence of image of a scene and an output providing an indication of one or more representative images for the scene according to an analysis of the scene.

25. A method for automatic color correction of a motion picture comprising a sequence of clips, wherein each clip comprises a sequence of images, in a nonlinear video editing system, comprising:

the nonlinear video editing system receiving an indication of a representative image for each clip in the sequence;

the nonlinear video editing system analyzing characteristics of the representative image for each clip;

the nonlinear video editing system determining parameters for a color correction operation for each clip according to the analyzed characteristics of the representative image for the clip; and the nonlinear video editing system applying to each image in the clip, including at least one image other than the representative image, the color correction operation with the parameters determined for the clip.

26. The method of claim 25, wherein analyzing characteristics of the representative image comprises:

generating a two-dimensional histogram of colors in die representative image, wherein the two-dimensional histogram includes a white point and determining an offset between a peak value in the two-dimensional histogram and the white point.

27. The method of claim 26, wherein determining parameters comprises:
using the determined offset to determine an offset for color correction of the image.

28. The method of claim 27, wherein generating the two-dimensional histogram comprises:
for each pixel, determining a weighting for the pixel with respect to its classification as a shadow or highlight; and
generating a two-dimensional histogram for each of shadows and highlights using the determined weightings for each pixel.

29. The method of claim 28, wherein determining parameters comprises:
using the determined offset for shadows to determine an offset for color correction of shadows;
using the determined offset for highlights to determine an offset for color correction of highlights; and
using the determined offsets for shadows and highlights to determine an offset for color correction of midtones.

30. The method of claim 25, wherein analyzing characteristics of the representative image comprises:
generating a histogram of luminance in the representative image, whereby the histogram indicates a darkest value and a brightest value.

31. The method of claim 30, wherein determining parameters comprises:
determining adjustments to histograms of colors in the representative image to match a darkest value and a brightest value for each color to the darkest value and brightest value for the luminance.

32. The method of claim 25, wherein receiving an indication of one or more representative images for a clip comprises the nonlinear video editing system selecting the one or more representative images for the clip according to an analysis of the clip.

33. A method for use in a nonlinear video editing system for providing automatic color correction of a sequence of scenes in a motion picture, wherein each scene comprises a sequence of images, comprising:
for each scene:
the nonlinear video editing system receiving an indication of one or more representative images in a sequence of images of die scene in a motion picture;
the nonlinear video editing system analyzing characteristics of the one or more representative images;
the nonlinear video editing system determining a set of parameters for a color correction operation according to the analyzed characteristics of the one or more representative images;
the nonlinear video editing system applying the color correction operation with the determined set of parameters to the sequence of images of the scene including images other than the representative image.

34. The method of claim 33, wherein receiving an indication of one or more representative images for a scene comprises the nonlinear video editing system selecting the one or more representative images for the scene according to an analysis of the scene.

* * * * *